(12) United States Patent
Johns

(10) Patent No.: US 8,932,755 B2
(45) Date of Patent: Jan. 13, 2015

(54) SPREADING MEANS FOR THE ACTIVE MATERIAL OF A NEGATIVE ELECTRODE

(75) Inventor: Frank Johns, Sarstedt (DE)

(73) Assignee: Johnson Controls Autobatterie GmbH & Co. KGaA (DE)

( * ) Notice: Subject to any disclaimer, the term of this patent is extended or adjusted under 35 U.S.C. 154(b) by 930 days.

(21) Appl. No.: 13/126,358

(22) PCT Filed: Oct. 28, 2009

(86) PCT No.: PCT/EP2009/007713
§ 371 (c)(1),
(2), (4) Date: Jun. 23, 2011

(87) PCT Pub. No.: WO2010/049143
PCT Pub. Date: May 6, 2010

(65) Prior Publication Data
US 2012/0308888 A1 Dec. 6, 2012

(30) Foreign Application Priority Data

Oct. 28, 2008 (DE) .......................... 10 2008 053 509

(51) Int. Cl.
*H01M 4/60* (2006.01)
*H01M 4/62* (2006.01)

(52) U.S. Cl.
CPC .................................... *H01M 4/627* (2013.01)
USPC ....................................................... 429/215

(58) Field of Classification Search
USPC ........................................ 429/215; 252/182.1
See application file for complete search history.

(56) References Cited

U.S. PATENT DOCUMENTS

2007/0118000 A1* 5/2007 Groth et al. .................... 562/571
2008/0168865 A1* 7/2008 Zhang et al. .................... 75/751

FOREIGN PATENT DOCUMENTS

| CN | 1 960 049 A | 5/2007 |
| CN | 101 047 241 A | 10/2007 |
| CS | 233 764 B1 | 3/1985 |
| DE | 25 24 871 A1 | 2/1976 |
| DE | 2754605 | 6/1979 |
| DE | 42 24 134 A1 | 1/1994 |
| EP | 0819145 | 1/1998 |
| JP | 2005 032633 A | 2/2005 |

OTHER PUBLICATIONS

International Preliminary Search Report on Patentability for International Application No. PCT/EP09/007713 dated May 12, 2011 (English translation).

* cited by examiner

*Primary Examiner* — Muhammad Siddiquee
(74) *Attorney, Agent, or Firm* — Boardman & Clark LLP

(57) ABSTRACT

The invention relates to performance improvements in lead accumulators and lead-acid batteries by admixing so-called expanders or spreading materials to the active negative materials. Succinates are proposed as a new synthetic and consequently chemically clearly defined spreading means that can be used in place of lignin sulphonates, particularly iminodisuccinates or succinyl groups or oligomers containing iminosuccinyl groups or polymer compounds, individually or in any mixtures.

3 Claims, No Drawings

SPREADING MEANS FOR THE ACTIVE MATERIAL OF A NEGATIVE ELECTRODE

The invention relates to an expander for the active material of an electrode, especially in a lead accumulator, and to a plate and to a lead accumulator comprising this expander.

The invention relates to the field of performance improvements in batteries and accumulators by addition of expanders to the active materials of the negative electrodes, specifically in lead accumulators or lead acid batteries.

In batteries or accumulators, the ratio of positive active material, negative active material and electrolyte must be optimal, in order to achieve the best possible performance. A poorly utilized material leads to unproductive weight and unnecessary costs coupled with reduced lifetime.

Therefore, expanders are added to the negative active electrode materials, which are intended to prevent unfavorable crystallization during the charging operations in favor of spongy and finely crystalline structures with large surface area. The aims are:
- a high electrochemically active surface area,
- a high starting performance and long maintenance of this starting performance,
- better cold starting characteristics,
- high charge capacity even at low temperatures,
- the delay or retarding of sintering under cyclic stress,
- reduction in self-discharging of the plates,
- a longer lifetime overall.

The most common expanders include organic expanders based on lignin. These expanders are based on natural raw materials and have a complex composition which varies according to the origin of the product. The use of expanders which are obtained from natural raw materials results in varying properties of the batteries or accumulators. These substances have different contents of functional groups such as methoxy, sulfo, carboxyl and phenol groups, which lead to different currents drawn, cold start voltages and cold start discharge times.

There have therefore already been proposals, instead of the natural substance-based expanders, to use synthetic expanders which are chemically defined and thus lead to more defined, more stable and better foreseeable properties in the active electrode material.

DE 27 54 605 A1 discloses using ferulic acid as an expander. However, the use of ferulic acid has not become established in practice.

The object of the invention is to find a novel synthetic expander which avoids the disadvantages in the prior art and which can replace the inexpensive and widely used lignosulfonates.

In general terms, the object is achieved by an expander for the active, especially the negative, material of an electrode, said expander having a content of at least one succinate or of succinic acid or derivatives thereof, such as iminosuccinic acid. The expander may comprise or consist of one or more succinates. It is also possible to use known expanders mixed with at least one succinate.

In addition, the object is achieved by the use of at least one succinate or of succinic acid or derivatives thereof, such as iminosuccinic acid, as an expander or in an expander composition for the negative active material of a lead accumulator, and by a plate for a lead accumulator comprising a grid and a paste which covers the grid and comprises water, a lead compound and the inventive expander, and also by a lead accumulator with a negative active material which comprises the inventive expander.

The succinate may preferably be an iminodisuccinic salt, especially an iminodisuccinic alkali metal, alkaline earth metal or ammonium salt, or an oligomeric or polymeric compound containing succinyl groups or iminosuccinyl groups—individually or in any desired mixtures therewith or thereof.

In a particularly preferred embodiment, the inventive expander consists of tetrasodium iminodisuccinate (iminodisuccinic acid sodium salt) or comprises this compound.

Oligomeric or polymeric compounds containing succinyl groups or iminosuccinyl groups are those compounds which contain two or more succinyl groups or iminosuccinyl groups with the following general structure:

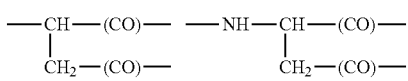

The oligomeric or polymeric compounds containing succinyl groups of iminosuccinyl groups used may be those as described in EP 0 819 145 B1, the content of which is hereby incorporated by reference.

An example of suitable expander is the product Baypure®CX with a composition, as the dry product, of
- approx. 74% iminodisuccinic acid sodium salt
- approx. 6% $H_2O$
- approx. 13% aspartic acid
- approx. 2% fumaric acid
- approx. 0.1% maleic acid
- approx. 0.1% malic acid The inventive expander has a constant chemical composition in each case, such that the electrochemical properties and the effect on the battery performance are homogenized. The thermal stability of the inventive expanders is better compared to lignosulfonates. This also distinctly improves the lifetime and cycle stability. In terms of the remaining properties, the inventive expander is at least equivalent to those based on lignin.

The inventive expander or an expander mixture which comprises the inventive expander is used within the active electrode material advantageously in an amount of 0.05 to 3% by weight, based on the solid content of the material.

EXAMPLE

Plates or ultimately lead acid batteries or lead accumulators with a negative active material according to the invention are produced by the customary, commonly known processes. The starting materials for the lead-containing negative active material are mixed and converted to a paste with sulfuric acid. The mixture may contain, for example, 0.2% by weight of tetrasodium iminodisuccinate ($C_8H_5O_8NNa_4$; (Na—OOC—CH—$CH_2$—COONa)$_2$NH) as an expander. The active material is then painted onto a grid and dried and/or aged. The plate grids with polarity are assembled to plate sets and bonded to one another. These plate sets are then assembled to plate assemblies and, after insertion of separators, introduced into a monobloc box in the customary manner, which is sealed and provided with poles, and then formed.

A typical material for a negative lead electrode according to this invention is composed of:
- 84.0% by weight of lead dust
- 9.0% by weight of water
- 5.0% by weight of sulfuric acid (d=1.4 g/ml)
- 0.05 to 3% by weight of succinate (in the sense of the invention, including mixtures)

ad 100% by weight a mixture of barium sulfate end/or carbon black/graphite or mixtures thereof, and optionally polymer flakes or fibers.

The durability studies on batteries which comprise the inventive expander in their material for the negative electrode showed that improved SOC (state of charge) and dynamic charge acceptance (DCA) values can be achieved. As the prior art, an active negative material with lignosulfonate as an expander was used. While the SOC remained the same over the cyclic stress in the comparative batteries, the SOC value increased with the number of cycles in batteries with the inventive expander. The same results were observed for the current drawn over the cycles. Here too, the DCA values of the inventive batteries were much higher than the batteries with lignosulfonates as expanders.

The invention claimed is:

1. An active material of an electrode comprising an expander, wherein the expander includes a compound which is selected from the group consisting of at least one succinate, at least one succinic acid, and at least one succinic acid derivative, wherein the at least one succinate of the expander is an iminodisuccinic salt, wherein the iminodisuccinic salt is selected from the group consisting of an iminodisuccinic alkali metal, an alkaline earth metal, and an ammonium salt.

2. A plate for a lead accumulator comprising: a grid; and a paste which covers the grid, the paste including water, a lead compound and an expander, wherein the expander includes a compound which is selected from the group consisting of at least one succinate, at least one succinic acid, and at least one succinic acid derivative, wherein the at least one succinate of the expander is an iminodisuccinic salt, wherein the iminodisuccinic salt is selected from the group consisting of an iminodisuccinic alkali metal, an alkaline earth metal, and an ammonium salt.

3. A lead accumulator with a negative active material comprising an expander, wherein the expander includes a compound which is selected from the group consisting of at least one succinate, at least one succinic acid, and at least one succinic acid derivative, wherein the at least one succinate of the expander is an iminodisuccinic salt, wherein the iminodisuccinic salt is selected from the group consisting of an iminodisuccinic alkali metal, an alkaline earth metal, and an ammonium salt.

* * * * *